United States Patent [19]
Van Oosten

[11] Patent Number: 6,009,896
[45] Date of Patent: Jan. 4, 2000

[54] SHUT-OFF VALVE

[75] Inventor: Henk Van Oosten, Gorredijk, Netherlands

[73] Assignee: Hovap International (Holland) B.V., Sneek, Netherlands

[21] Appl. No.: 08/941,239

[22] Filed: Sep. 30, 1997

[30] Foreign Application Priority Data

Oct. 7, 1996 [NL] Netherlands ........................... 1004216

[51] Int. Cl.⁷ ................................ B08B 3/02; B08B 9/02
[52] U.S. Cl. .................... 137/240; 137/312; 137/614.17; 137/614.19
[58] Field of Search .................... 137/240, 312, 137/614.17, 614.18, 614.19

[56] References Cited

U.S. PATENT DOCUMENTS

| | | | |
|---|---|---|---|
| 1,830,407 | 11/1931 | Prenveille | 251/120 |
| 3,003,423 | 10/1961 | Drutchas | 417/300 |
| 3,426,798 | 2/1969 | Chernak | 251/121 |
| 3,857,542 | 12/1974 | Heymann | 251/120 |
| 4,552,167 | 11/1985 | Brakelmann | 137/240 |
| 4,605,035 | 8/1986 | Rasmussen et al. | 137/240 |
| 4,655,253 | 4/1987 | Ourensma | 137/240 |
| 5,645,102 | 7/1997 | Brackelmann et al. | 137/240 |
| 5,649,686 | 7/1997 | Wilson | 251/120 |

FOREIGN PATENT DOCUMENTS

| | | |
|---|---|---|
| 0 140 432 | 5/1985 | European Pat. Off. . |
| 0 646 741 | 4/1995 | European Pat. Off. . |
| 0 646 741 A1 | 4/1995 | European Pat. Off. . |
| 2 160 950 | 1/1986 | United Kingdom . |

OTHER PUBLICATIONS

Patent Abstracts of Japan, vol. 010, No. 193 (M–496), Jul. 8, 1986 & JP 61 038272A (Yamatake Honeywell Co Ltd), Feb. 24, 1986—Abstract.

*Primary Examiner*—George L. Walton
*Attorney, Agent, or Firm*—Evenson, McKeown, Edwards & Lenahan, PLLC

[57] ABSTRACT

A shut-off valve includes a valve housing having at least two mutually connecting chambers communicating with each other in each case via a passage opening bounded by a valve seat surface and provided with ports for feed and discharge of a medium. The shut-off valve includes a valve body which is provided with a closing surface co-acting with each valve seat surface for closing the associated passage opening and which is movable between a first position in which the closing surface is in sealing contact with the valve seat surface and a second position in which the closing surface is situated at a distance from the valve seat surface. Connecting onto either of the valve seat surface or the closing surface, at the position opposite which the other is situated close to the end of the movement from the second to the first position, is a slit-forming surface with at least one considerable axial directional component, and a plurality of notches is formed in the slit-forming surface.

20 Claims, 2 Drawing Sheets

SHUT-OFF VALVE

BACKGROUND AND SUMMARY OF THE INVENTION

The invention relates to a shut-off valve which comprises a valve housing having at least two mutually connecting chambers communicating with each other in each ease via a passage opening bounded by a valve seat surface and provided with ports for feed and discharge of a medium. Arranged in the valve housing is a valve body which is provided with at least one closing surface which can co-act with the valve seat surface. In a situation where the closing surface of the valve body is in sealing contact with the valve seat surface the connection between the chambers is closed and, when the valve body is moved such that the closing surface is released from the valve seat surface, the shut-off valve is opened.

Shut-off valves of this type are known wherein connecting to the valve seat surface or the closing surface is a slit-forming surface which forms with the opposite surface a slit extending all around in a practically closed position of the valve body. This slit-forming surface has at least one considerable axial directional component.

It can occur in such shut-off valves that the medium flowing through the slit causes resonances in the shut-off valve.

With the shut-off valve according to the present invention such resonances are prevented in a reliable manner. A stabilizing of the flow is achieved due to the notches which define a locally larger flow passage than the slit, so that no resonances occur.

The invention is particularly suitable in an embodiment wherein the valve seat surface or closing surface lying opposite the slit-forming surface is provided with at least one sealing ring of flexible material. Sealing rings of flexible material normally increase the susceptibility to resonance because they are compressed to a greater or lesser extent as a result of the pressure fluctuations occurring during resonance. Occurrence of resonances is also reliably prevented in this embodiment due to the notches.

The invention is particularly suitable for use in a shut-off valve of the leak detection type comprising a valve body with two parts movable relative to each other which each comprise a closing surface and between which debouches a leak detection channel leading outside the housing.

Such shut-off valves are applied particularly in the food processing industry where a possible leakage must be located immediately in order to prevent contamination of product liquids. Proper cleaning of the shut-off valve is herein essential to prevent growth of micro-organisms.

In such shut-off valves it is known to clean the leak detection channel simultaneously with one of the chambers by moving the valve body a short distance out of the closed position so that the cleaning liquid flows through the slit between the slit-forming surface and the oppositely located valve seat surface or closing surface. The cleaning liquid then flows to the outside via the leak detection channel.

In order to achieve good cleaning with a minimum quantity of washing liquid, which is desirable for environmental reasons, a small slit width is recommended.

However, in the known shut-off valves the stated resonance effect occurs to an extent which is progressively greater as the slit width decreases, so that in the shut-off valves of the prior art it is necessary to work with a considerable slit width. With the invention however, the slit width can be greatly reduced without the resonance effect occurring. Even when a sealing ring of flexible material is used and this sealing ring lies practically against the opposite surface, still no resonance occurs because possible pressure variations causing the resonance are equalized over this sealing ring immediately via the notches.

The invention will be further elucidated in the following description with reference to the embodiment shown in the figures.

DETAILED DESCRIPTION OF THE DRAWINGS

Figure 1:
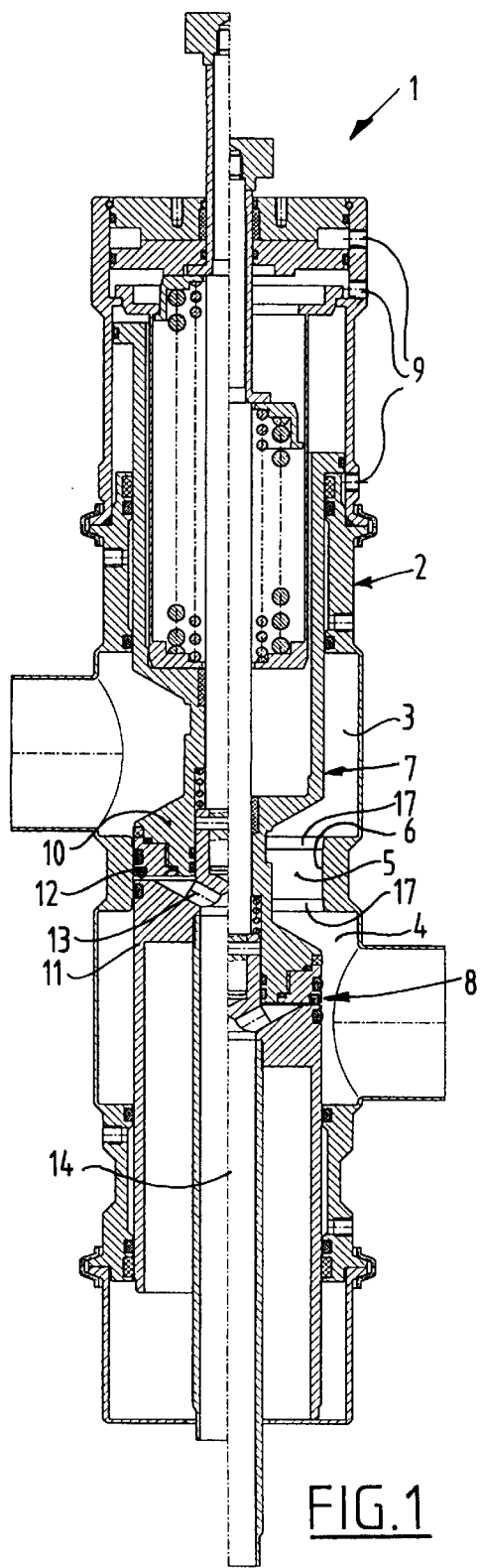
FIG. 1 shows a longitudinal section of a shut-off valve of the leak detection type according to the invention, wherein the left-hand side shows the shut-off valve in the fully closed situation and the right-hand side shows the shut-off valve in the opened situation.

The shut-off valve 1 as show n in FIG. 1 comprises a housing 2 in which are formed an upper chamber 3 and a lower chamber 4. Each of these chambers 3, 4 is connected via a port to a conduit (not shown) through which particularly liquids are transported.

A passage opening 5 is formed in the housing between chambers 3 and 4. This passage opening 5 is bounded by a cylindrical valve seat surface 6. Further arranged in housing 2 is a valve body 7 which, as seen in the figure, can move upward and downward. On the lefthand side of FIG. 1 the valve body 7 is shown in the moved upward position in which a closing surface 8 is in sealing engagement with valve seat surface 6. The connection between chambers 3 and 4 and between the conduits connected thereto is thus closed.

On the right-hand side of FIG. 1 the valve body 7 is moved downward and a narrow portion of valve body 7 is situated at the position of passage opening 5 so that a connection is formed between chambers 3, 4 and the conduits connected thereto.

In order to obtain good and reliable sealing the closing surface 8 is provided with two sealing rings, in particular O-rings. In shut-off valve 1 the valve body 7 comprises two parts which are movable slightly relative to each other, an upper part 10 and a lower part 11. Defined between these two parts is a leak detection space 13 which communicates with a leak detection channel 14 in the lower valve body part 11.

Between the upper and lower valve body parts 10, 11 is arranged an axial seal 12 which, when the valve parts are moved toward each other, closes leak detection space 13 relative to the chambers. In the open situation of the valve shown on the right-hand side in FIG. 1 the leak detection space is closed for obvious reasons because upper part 10 and lower part 11 of valve body 7 are moved toward each other.

In the closed situation of the shut-off valve shown on the left in FIG. 1 the upper part 10 and lower part 11 of valve body 7 are moved slightly away from each other, whereby seal 12 no longer makes contact. Leakage liquid possibly occurring in closing surface 8 via any of the radial sealing rings can thus flow into the leak detection space 13 and leave the shut-off valve via leak detection channel 14, whereby a visible indication of this leakage is obtained. Leakage liquid is moreover thus prevented from entering the other chamber, which would be very undesirable, especially if one of the chambers contains for instance a cleaning liquid and the other a product liquid.

The different movements of the valve body 7 in housing 2 are brought about by selective feed of a fluid under pressure, in particular compressed air, to one of the ports 9. Since the specific operation of the valve body falls outside the scope of the present application, it is not further described here.

From the closed position shown on the left in FIG. 1 the valve body parts 10 and 11 can be moved respectively slightly upward and slightly downward such that the associated sealing ring is released from valve seat surface 6. These two situations are shown respectively on the left-hand and right-hand sides of FIG. 2.

These movement options of the valve body parts 10 and 11 are provided to enable cleaning of the sealing rings and leak detection space at the moment an adjacent chamber is being flushed with cleaning liquid.

Figure 2:
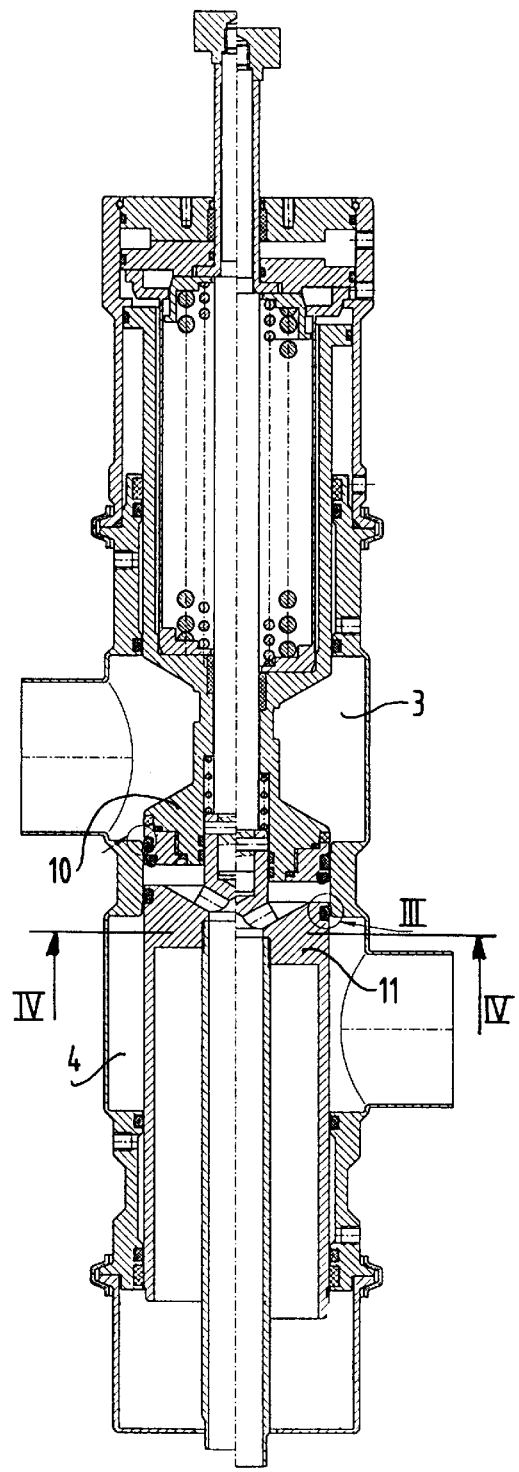
FIG. 2 shows a longitudinal section corresponding with FIG. 1 wherein the left-hand side shows a flushing position with flushing via the upper chamber and the right-hand side shows a flushing position with flushing via the lower chamber.

The situation shown on the left in FIG. 2 can be adjusted when upper chamber 3 is flushed. The situation shown on the right in FIG. 2 can be adjusted when lower chamber 4 is flushed.

As shown in FIG. 1, a slit-forming surface 17 connects onto either end of valve seat surface 6, which surface 17 has a slightly larger diameter than valve seat surface 6. ~hen now the relevant valve body part 10 or 11 is moved slightly upward or downward, the seal arranged in this valve body part comes to lie at the height of the relevant slit-forming surface 17, whereby the liquid can flow through between the formed slit to leak detection space 13 and via this through leak detection channel 14.

The relevant sealing ring is herein flushed clean.

Figure 3:
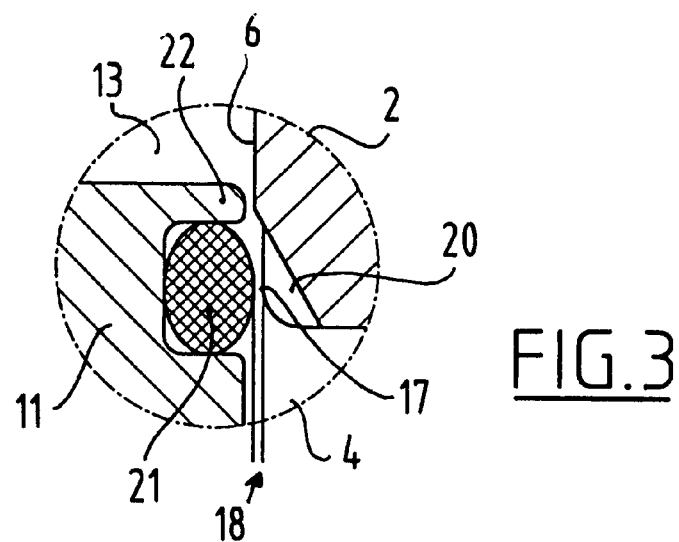
FIG. 3 shows a detail according to arrow III—III in FIG. 2.

FIG. 3 shows the situation wherein the lower valve body part 11 is moved slightly downward from the closed position of the shut-off valve and the sealing ring 21 thereof is moved opposite slit-forming surface 17. As this FIG. 3 shows, an annular slit 18 is thus created through which cleaning liquid can flow from lower chamber 4 into leak detection space 13.

In slit-forming surface 17 is formed a plurality of notches 20 which form, in any case relative to the width of slit 18, a comparatively large passage. These notches 20 provide a pressure equalization over sealing ring 21. Pressure differences which can result in resonances are hereby equalized.

The width of slit 18 can be chosen very narrow without resonance occurring, whereby in favorable manner the liquid loss during flushing of the sealing ring and the leak detection space and the leak detection channel remains limited.

Figure 4:
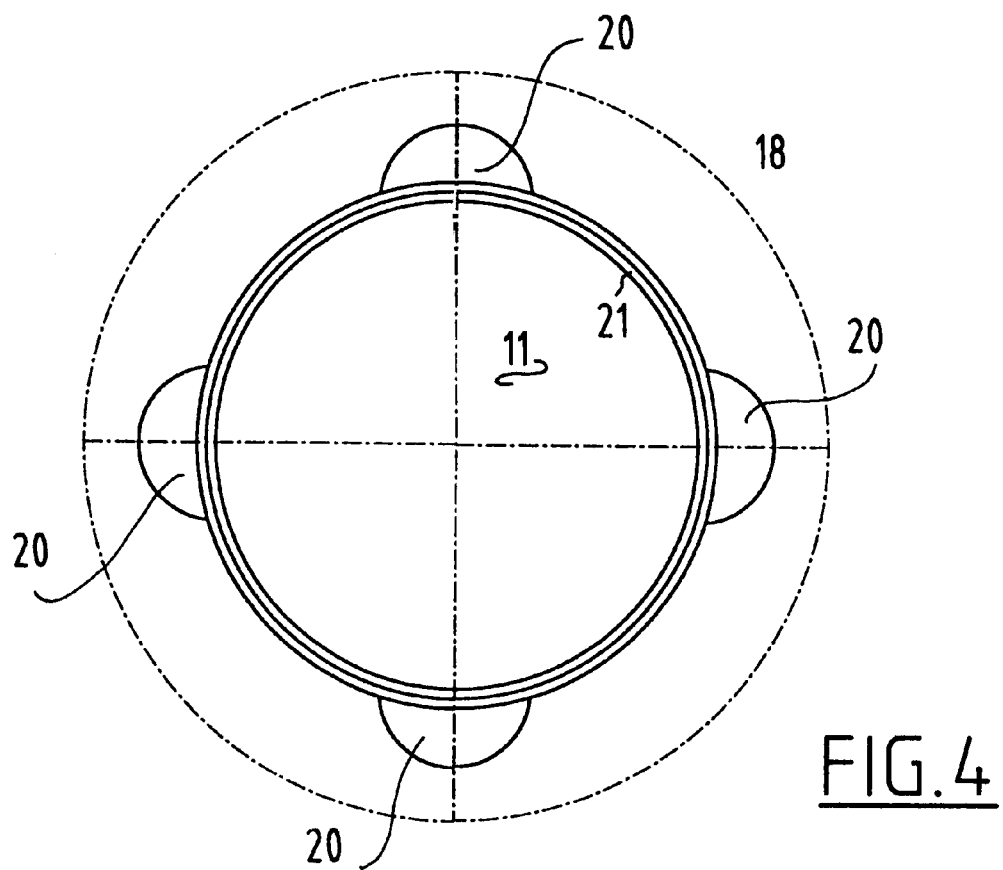
FIG. 4 shows a simplified section along IV—IV ln FIG. 2.

FIG. 4 shows schematically the cross-section along IV—IV in FIG. 2, wherein the lower valve body part 11 is shown as one entity. In this section can be seen that four notches 20 are arranged in regular distribution over the periphery. These notches 20 are formed by a milling process.

As further shown in FIG. 3, the upper edge 22 of valve body part 11 is still just at the height of the valve seat surface 6 in the shown flushing position, so that a narrow slit is formed over the periphery with the desired low liquid loss, while the pressure equalizing effect over sealing ring 21 is still achieved as a result of the notch 20.

It is noted that the invention is not limited to a shut-off valve such as for instance shown in the figures and described above. Any shut-off valve wherein in the one or other operating situation a relatively narrow slit is formed which can result in a flow such that resonance occurs can be embodied according to the invention, i.e. be provided with notches in the slit-forming surface. The valve seat surface and closing surface can herein be oriented other than purely radially as in the discussed embodiment.

What we claim is:

1. Shut-off valve comprising a valve housing having at least two mutually connecting chambers communicating with each other in each case via a passage opening bounded by a valve seat surface and provided with ports for feed and discharge of a medium, a valve body which is provided with a closing surface co-acting with each valve seat surface for closing the associated passage opening and which is movable between a first position in which the closing surface is in sealing contact with the valve seat surface and a second position in which the closing surface is situated at a distance from the valve seat surface, wherein onto either of the valve seat surface or the closing surface, at the position opposite which the other is situated close to the end of the movement from the second to the first position, there connects a slit-forming surface with at least one considerable axial directional component, and wherein a plurality of notches are formed in the slit-forming surface.

2. Shut-off valve as claimed in claim 1, wherein the valve seat surface or closing surface lying opposite the slit-forming surface is provided with at least one sealing ring of flexible material.

3. Shut-off valve as claimed in claim 1 or 2, wherein the valve seat surface and the slit-forming surface are substantially cylindrical.

4. Shut-off valve as claimed in claim 3, wherein the slit-forming surface connects to the valve seat surface and has a slightly larger diameter than the valve seat surface.

5. Shut-off valve as claimed in claim 3, wherein the valve body comprises two parts movable relative to each other each having a closing surface and wherein a respective slit-forming surface with nothches is situated on either side of the passage opening.

6. Shut-off valve as claimed in claim 5, wherein the shut-off valve is of the leak detection type with a leak detectin channel debouching between the closing surfaces and leading outside the housing in the first position of the valve body.

7. Shut-off valve as claimed in claim 1, wherein the notches are arranged in a regular distribution over the periphery of the slit-forming surface.

8. Shut-off valve according to claim 1, wherein said notches define locally larger flow passages between said valve body and said housing than the rest of said slit-forming surface.

9. Shut-off valve according to claim 1, wherein said notches equalize pressure across said slit-forming surface.

10. Shut-off valve, comprising:
a valve housing having a valve seat surface;
a valve body part disposed in said valve housing, said valve body part having a closing surface which is engageable with said valve seat surface;
a slit-forming surface formed in one of the valve seat surface and the closing surface such that said slit-forming surface is spaced from the other one of the valve seat surface and the closing surface to define a slit therebetween, said slit-forming surface extending over an axial distance, said valve body part being axially movable from a closed position in which said closing surface is engaged with said valve seat surface to a flushing position in which said closing surface and said valve seat surface axially overlap along said axial distance, a plurality of notches being formed in said one of the valve seat surface and the closing surface contiguous with said slit-forming surface.

11. Shut-off valve according to claim 10, wherein in said flushing position, said slit and said notches define a flow passage between said valve body and said housing.

12. Shut-off valve according to claim 10, wherein said valve body part is further axially movable into an open position in which said closing surface is axially spaced from said valve seat surface.

13. Shut-off valve according to claim 10, wherein said other one of the valve seat surface and the closing surface is provided with at least one sealing ring of flexible material.

14. Shut-off valve according to claim 10, wherein the valve seat surface and the slit-forming surface are substantially cylindrical.

15. Shut-off valve according to claim 14, wherein the slit-forming surface is formed in said valve seat surface and has a slightly larger diameter than said valve seat surface.

16. Shut-off valve according to claim 10, wherein the notches are arranged in a regular distribution over the periphery of the slit-forming surface.

17. Shut-off valve according to claim 10, wherein said notches define locally larger flow passages between said valve body and said housing than the rest of said slit-forming surface.

18. Shut-off valve according to claim 10, wherein said notches equalize pressure across said slit-forming surface.

19. Shut-off valve according to claim 10, wherein said notches extend axially over at least a substantial portion of said axial distance.

20. Shut-off valve according to claim 10, further comprising another valve body part disposed in said valve housing, said valve body parts being axially movable apart from each other to communicate with a leak detection channel leading outside the housing.

* * * * *